United States Patent [19]

Hirsch et al.

[11] 4,450,013

[45] May 22, 1984

[54] GRINDING OR DISPERSING AGENTS FOR PIGMENTS

[75] Inventors: Guenter Hirsch, Mutterstadt; Gregor Ley, Wattenheim, both of Fed. Rep. of Germany

[73] Assignee: BASF Aktiengesellschaft, Ludwigshafen, Fed. Rep. of Germany

[21] Appl. No.: 387,196

[22] Filed: Jun. 10, 1982

[30] Foreign Application Priority Data

Jun. 15, 1981 [DE] Fed. Rep. of Germany ....... 3123732

[51] Int. Cl.³ ................................................. C09C 3/00
[52] U.S. Cl. ............................. 106/308 N; 106/308 S
[58] Field of Search ........... 106/308 N, 308 M, 308 S, 106/309

[56] References Cited

U.S. PATENT DOCUMENTS 3,022,299  2/1962  Schmidt et al. ...................... 106/309
4,158,572  6/1979  Blackburn et al. .................. 106/309
4,243,430  1/1981  Sperry et al. ........................ 106/309

*Primary Examiner*—James Poer
*Attorney, Agent, or Firm*—David L. Hedden; Joseph D. Michaels

[57] ABSTRACT

The subject invention relates to compositions which are used as auxiliaries for pigment grinding and as dispersing agents for pigments. The compositions are essentially copolymers based upon acrylic acid, methacrylic acid, and sulfonic acid group containing monomers such as 2-acrylamido-2-methylpropanesulfonic acid.

4 Claims, No Drawings

GRINDING OR DISPERSING AGENTS FOR PIGMENTS

BACKGROUND OF THE INVENTION

1. Field of the Invention

The subject invention relates to compositions which are used as grinding or dispersing agents for pigments. The compositions are essentially copolymers based upon acrylic acid, methacrylic acid, and sulfonic acid group containing monomers such as 2-acrylamido-2-methylpropanesulfonic acid.

2. Description of the Prior Art

U.S. Pat. No. 3,898,037 describes copolymers of (meth)acrylicamidoalkylsulfonic acid and acrylic acid or methacrylic acid which are used in small quantities (up to approximately 100 ppm) as corrosion inhibitors. The copolymers may be prepared by copolymerization of monomer mixtures in solvent mixtures such as water and isopropanol.

A process for the preparation of polymers of acrylic acid or methacrylic acid or their mixtures is known from German Pat. No. 27 57 329 where the monomers are polymerized in isopropanol or mixtures of water and isopropanol which contain at least 40 percent by weight of isopropanol. The polymerization is carried out with the aid of free radical polymerization initiators at temperatures of 120° C. to 200° C. under pressure. The polymers are used as dispersing agents in the preparation of aqueous pigment slurries for paper sizes. The viscosity of aqueous pigment slurries which contain a polyacrylate as dispersing agent is temperature dependent, decreasing with increased temperature. Even though the polymers are good dispersing agents, they are not as well suited as grinding agents for the preparation of aqueous pigment slurries. This is because the grinding takes place at a temperature range in which the viscosity of the pigment slurry is very low (compared with that at room temperature) so that lower than desired shear forces occur during the grinding process. As a result, the pigment size is not effectively reduced.

Improved grinding and dispersing agents for the preparation of highly concentrated aqueous slurries of pigments for paper sizes are needed. They must be effective and result in highly concentrated aqueous pigment slurries, the viscosity of which is reduced less by an increase in temperature than is the case in aqueous pigment slurries which are prepared with the aid of known agents.

SUMMARY OF THE INVENTION

The subject invention relates to an improved process for grinding pigments and dispersing pigments. The improvement resides in using as the grinding or dispersing agents a copolymer comprising in polymerized form (a) from 40 to 90 percent by weight of acrylic acid and/or methacrylic acid;

(b) from 10 to 60 percent by weight of a compound having the formula

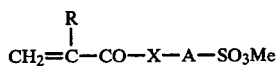

wherein
R=H, CH$_3$
X=NH, O
A=C$_1$- to C$_8$-alkylene or C$_1$- to C$_3$-substituted alkylene and
Me=H, Na, K, NH$_4$, and (c) from 0 to 10 percent by weight of another ethylenically unsaturated comonomer.

The copolymers have a pH value of 7 to 8 in a 1 percent aqueous solution at 20° C. and are used as a grinding auxiliary or dispersant in the preparation of highly concentrated aqueous slurries of pigments for paper sizes. Preferably used are copolymers which are produced by copolymerization of monomer mixtures in isopropanol or solvent mixtures of water and isopropanol containing at least 40 percent by weight of isopropanol at temperatures of 95° C. to 180° C. under pressure. Of particular importance are those copolymers which contain 2-acrylamido-2-methyl-propanesulfonic acid in polymerized form as the monomer of group (b).

DESCRIPTION OF THE PREFERRED EMBODIMENT

The copolymers of the subject invention contain acrylic acid or methacrylic acid or mixtures of acrylic acid and methacrylic acid in any desired ratios as the monomer of group (a). The monomers of group (a) are present in the structure of the copolymers in an amount of 40 to 90 percent by weight.

The monomers of group (b) can be characterized with the aid of the general formula (I):

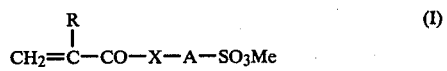

wherein
R=H, CH$_3$
X=NH, O
A=C$_1$- to C$_8$-alkylene or C$_1$- to C$_3$-substituted alkylene and
Me=H, Na, K, NH$_4$ and.

Compounds of this type are commercially available. Those compounds of formula I in which X represents oxygen are produced, for instance, by reacting sultones such as propane or butanesultone with the potassium salts of methacrylic acid and/or acrylic acid.

Preferably used as monomers of group (b) are compounds having formula (II)

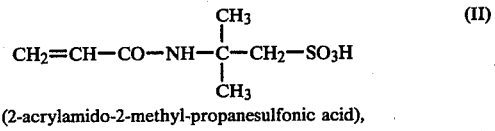
(2-acrylamido-2-methyl-propanesulfonic acid),

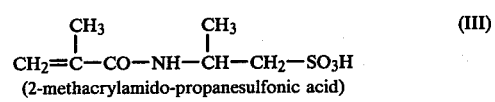
(2-methacrylamido-propanesulfonic acid)

or

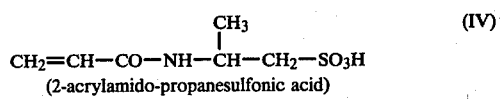
(2-acrylamido-propanesulfonic acid)

The monomers of group (b) are present in the structure of the copolymers to a degree of 10 to 60, preferably 15 to 45 percent by weight.

In addition to the monomers of groups (a) and (b), the copolymers may also contain other ethylenically unsaturated monomers in polymerized form. A modification of the properties of the copolymers is achieved thereby. This group of monomers, however, is used only to such a degree that the water solubility of the copolymers and/or the copolymer salts is assured. Suitable monomers of group (c) include, for example, acrylates and methylacrylates which are derived from alcohols with 1 to 4 carbon atoms such as methylacrylate, ethylacrylate, methylmethacrylate, hydroxypropylacrylate and butane diol monoacrylate, esters or half esters of maleic acid, acrylonitrile, methacrylonitrile, acrylamide and methacrylamide.

The copolymerization is initiated with the aid of known free radical polymerization catalysts. Hydrogen peroxide is used on a preferred basis. In addition to hydrogen peroxide, water soluble polymerization initiators such as potassium or sodium peroxydisulfate or organic initiators such as benzoylperoxide, cumylhydroperoxide, redox catalysts as well as azobisisobutyric acid nitrile are suited.

The polymers are prepared in the presence of polymerization regulators. In the most simple manner, this is implemented by conducting the polymerization in a regulating solvent. Possible regulating solvents include, for example, alcohols with 1 to 4 carbon atoms. Preferably used as regulating solvents are pure isopropanol or mixtures of water and isopropanol containing at least 40 percent by weight of isopropanol. Ethylenically unsaturated alcohols such as butenols are also good polymerization regulators. Therefore, mixtures of low alcohols, for example, mixtures of ethanol and isopropanol, ethanol and butenol, or butenol and isopropanol are also suited as the medium for the copolymerization of the above-mentioned monomer mixtures. The proportion of alcohols in the solvent for the polymerization is above 30 percent by weight and preferably 40 percent by weight and above. Ketones such as acetone may also be used as auxiliary solvents. These auxiliary solvents are also used in quantities above 30 percent by weight based on the solvent. Additional very effective regulators are hydroxylammonium salts such as hydroxyl ammonium sulfate and alkyl substituted hydroxylammonium salts. These compounds are used in quantities of 1 to 6 percent by weight based on the monomer mixture to be polymerized. Other effective regulators are mercaptans. If hydroxylammonium salts and mercaptans are used as regulators, the copolymerization may also be conducted in water.

As a rule, the copolymerization is conducted in such a manner that part of the monomer mixture is initially placed in the polymerization reactor and that the copolymerization is started. Only after this process is completed is the monomer mixture added to the polymerization reactor on a continuous or batch type basis. In case of a solution polymerization, the entire quantity of the solvent can be placed in the polymerization reactor or only part of the solvent is placed in the reactor and the rest of the solvent is added during the polymerization together with the monomer. During the copolymerization the temperature may vary within a wide range and depends upon other things such as the polymerization initiator used. If redox catalysts are used, relatively low temperatures are selected, for example, temperatures in the range of 50° C. to 75° C. However, the copolymerization may be carried out equally well at the boiling point of the solvent and/or a solvent mixture as well as temperatures above this range if the copolymerization is carried out under pressure. The preparation of copolymers in isopropanol, or solvent mixtures of water and isopropanol containing at least 40 percent by weight of isopropanol, at temperatures of 95° C. to 180° C. under pressure are preferred. According to this process, copolymers with reproducible properties are obtained. The pressure which is a function of the reaction temperature is approximately 1 bar to 20 bars during the copolymerization but may also be above these values.

If an organic solvent was used as polymerization regulator during the copolymerization, it is removed by distillation upon completion of the copolymerization. If isopropanol and/or isopropanol-water mixtures were used as solvent, the isopropanol is distilled out of the reaction product and water, and subsequently an aqueous base such as sodium hydroxide solution, ammonium or potassium hydroxide solution is added to the residue. In this manner an aqueous solution of a copolymer salt is obtained. Ammonia or amines may also be used for neutralizing. As a rule, the pH value of the solution of polymer salt is adjusted to a value in the range of 5 to 12, preferably 7 to 8. The K-value of the polymer salt in 1 percent aqueous solution at 20° C. and a pH value of 7 to 8 is 15 to 50, preferably 20 to 40.

If alcohols and acetone are used as auxiliary solvents and/or polymerization regulators, these solvents may be removed from the reaction mixture by distillation after completion of the polymerization and may be used again for a subsequent copolymerization process. Particularly ethanol and isopropanol can be reclaimed as often as desired and may be reused for subsequent polymerization processes. It is only necessary to balance slight losses of alcohols by adding ethanol and/or isopropanol.

The copolymers produced in this manner are used as grinding and dispersing agents for the preparation of highly concentrated aqueous slurries of pigments for paper sizes. Based on the pigment, the amounts of copolymers used range from 0.05 to 1.0, preferably 0.3 to 0.6 percent by weight. Suitable pigments for the preparation of paper sizes include, for example, chalk, clay from primary and secondary deposits, satin white, titanium dioxide, kaolin and dolomite. From these pigments for paper sizing, highly concentrated aqueous slurries are produced which may have solids contents up to 90 percent by weight depending upon the type of pigment and its particle sizes. The solids content of clay slurries lies between 65 and 70 percent by weight; and in the case of chalk, the solids content of the aqueous slurries amounts to 75 to 85 percent by weight, and may reach up to 90 percent, particularly in those cases when the pigments have a wide spectrum of particle sizes. The aqueous slurries are preferably produced by adding the dispersing agent during the pigment grinding process. It is known that the pigments are ground in an aqueous medium. Ninety percent of the chalk, for instance, is ground to a particle size smaller than 2 microns, and in the case of clay, 85 percent of the grains are smaller than 2 microns. The entire dispersing agent can be added during the grinding process or one may proceed in such a manner that the dispersant is dissolved in water and then the powdered pigments are introduced into this mixture. If the copolymers are used as grinding auxiliaries, they are used in the same quantities as listed above for the dispersants. For grinding and/or dispersing of chalk, preferably 0.3 to 0.6 percent by weight of the copolymers are required whereas quantities in the range of 0.1 to 0.4 percent by weight are preferably used for applications involving clay. In producing aqueous slurries of chalk, even small quantities of the copolymer result in an obviously improved dispersability when compared with the commercially available products based on polyacrylates which were heretofore used for this purpose. In order to prepare aqueous highly concentrated chalk slurries with a certain viscosity, approximately 20 percent less of the sulfonic acid group containing copolymer is required than of a known acrylate in accordance with the state of the art. The copolymer containing the sulfonic acid groups are, therefore, preferably used for the preparation of highly concentrated aqueous chalk slurries for paper sizes. The pH value of the pigment slurries is 7 to 12.5 and, preferably, varies in the range from 7.5 to 10. Highly concentrated aqueous slurries are understood to be those in which the pigment content amounts to at least 65 percent by weight.

The parts listed in the examples are parts by weight. The percentages are relative to the weight of the substances unless otherwise stated. The K-values were measured according to H. Fikentscher, *Cellulose Chemistry*, vol. 13, pp. 48–64 and 71–74 (1932) in a 1 percent aqueous solution at a temperature of 25° C. with K being equal to $k \times 10^3$.

The viscosities of the aqueous pigment slurries were determined with a Brookfield viscosimeter at a temperature of 20° C. and 100 rpm.

PREPARATION OF THE COPOLYMERS

Copolymer 1

In a mixture of 315 parts of isopropanol and 315 parts of water, 136.5 parts of acrylic acid, 73.5 parts of 2-acrylamido-2-methylpropanesulfonic acid were dissolved and filled into a mixing flask which was in a water bath and which was equipped with agitator, reflux cooler and nitrogen feed. The mixture was subsequently heated to 60° C. and mixed with 7 parts of azobisisobutyric acid nitrile. The temperature of the reaction mixture increased to 80° C. as a result of the exothermal reaction. The reaction mixture was kept at this temperature for 3 hours. The resultant product was a clear copolymer solution of medium viscosity and having a solids content of 27.5 percent by weight. The copolymer had a K-value of 42.

Copolymer 2

A 4-liter steel vessel equipped with agitator, reflux cooler, nitrogen feed and 2 feed vessels, and which was heated with the aid of a water bath, was used as the polymerization device. The first feed vessel contained a mixture of 535.5 parts acrylic acid, 94.5 parts 2-acrylamido-2-methylpropanesulfonic acid, 705 parts isopropanol and 945 parts water. The second feed vessel contained a mixture of 105 parts isopropanol, 135 parts acetone and 21 parts azobisisobutyric acid nitrile. Twenty percent of the first feed was placed in the polymerization vessel and heated to 80° C. Upon reaching this temperature, 20 percent of the second feed was added. After a polymerization period of 15 minutes, the remainder of the two feeds were allowed to run into the reactor next to each other within a period of 2 hours. After completing the monomer feed, the reaction mixture was heated to 80° C. for 1 hour and was subsequently cooled. The result was a viscous copolymer solution to which 1000 parts of water were added. Following this process, 1500 ml of solvent mixture were removed by distillation in a rotation evaporator under reduced pressure and a temperature of approximately 60° C. By adding 600 parts of a 50 percent aqueous sodium hydroxide solution, the pH value of the copolymer solution was subsequently adjusted to 7. The aqueous solution of the copolymer had a solids content of approximately 39 percent by weight. The K-value of the copolymer was 25.

Copolymer 3

A 1.5 m³ polymerization vessel equipped with an anchor agitator, reflux cooler, vacuum connection and two feed vessels was used as polymerization equipment. Feed 1 consisted of a solution of 283.5 parts water, 211.5 parts isopropanol, 28.35 parts acrylamido-2-methylpropane sulfonic acid and 160.65 parts acrylic acid. Feed 2 consisted of a mixture of 31.5 parts isopropanol, 40.5 parts acetone and 6.3 parts azobisisobutyric acid nitrile. The content of the feed vessels and the polymerization vessel were initially purged with nitrogen and were then closed off. Following this process, approximately 20 percent of feed 1 was pressed into the polymerization vessel and the vessel contents were heated to a temperature of 80° C. Upon reaching this temperature, 20 percent of feed 2 was added increasing the temperature of the reaction mixture to 105° C. Approximately 15 minutes after reaching this temperature, feeds 1 and 2 were pumped into the reactor by means of metering pumps next to each other within a period of 2 hours. During this period, the polymerization was carried out at a temperature of 110° C. After completing the addition of monomers and polymerization initiators, the reaction mixture was after-polymerized at a temperature of 110° C. for approximately 1 hour. The mixture was then cooled to 70° C. and 30 parts of water were added. Acetone and isopropanol were removed by distillation under reduced pressure until the isopropanol content in the copolymer solution amounted to approximately 0.5 percent. The copolymer solution was cooled to approximately 30° C. and was adjusted to a pH value of 7.5 by adding 185 parts of 50 percent aqueous sodium hydroxide solution. The solids content of the copolymer solution was 35 percent by weight and the K-value of the copolymer was 31.

Copolymer 4

In accordance with the procedure given for the preparation of copolymer 2, a copolymer was prepared with a weight ratio of acrylic acid to 2-acrylamido-2-methylpropane sulfonic acid of 1:1. The copolymer had a K-value of 30.

Comparison Dispersing Agent

A dispersing agent for comparative purposes was prepared by following Example 1 of German Pat. No. 27 57 329. In accordance with this Example, acrylic acid in 48 percent aqueous isopropanol was polymerized with hydrogen peroxide as polymerization initiator at a temperature of 130° C. and a pressure of 4 bars.

Following the polymerization, the isopropanol was removed by distillation and a 45 percent aqueous solution of a polyacrylate having a pH value of 8.5 was produced by adding water and 50 percent aqueous sodium hydroxide solution.

PREPARATION OF AQUEOUS PIGMENT SLURRIES—GENERAL INSTRUCTIONS

In a 2-liter mixing vessel of stainless steel, 4 grams of one of the dispersing agents (in each case a 100 percent polymer) were dissolved in 1 liter of water, respectively. While vigorously stirring with a high speed lab agitator, 780 grams of a finely ground calcium carbonate (90 percent of the calcium carbonate had a particle size of <2 microns) were introduced in small portions within a period of 20 minutes with care being taken that the added pigment was largely dispersed. By adding aqueous sodium hydroxide solution, the pH value of the pigment slurry was adjusted to 9. The mixture was subsequently homogenized at room temperature for 5 minutes. Following this process, the viscosity of the aqueous pigment slurry was measured.

EXAMPLE 1

In accordance with the general instructions for the preparation of aqueous slurries of chalk pigments for paper sizes, 78 percent aqueous slurries were produced using 0.4 percent by weight of copolymer 1 based on the pigment. The viscosity of the aqueous pigment slurries was measured at various temperatures. For comparison purposes, a 78 percent aqueous slurry of the same pigment was produced using the comparison dispersion agent based on a polyacrylate. The viscosity of the known pigment slurries was measured at various temperatures. The results are compiled in Table I. The table shows that a more pronounced viscosity drop occurs in aqueous pigment slurries which were prepared with a well-known dispersing agent when the temperature is increased than in the case of the aqueous pigment slurries in which a copolymer according to this invention was used as the dispersing agent.

TABLE I

| Dispersing Agent | Viscosity (mPas) of the aqueous slurry at | | | |
|---|---|---|---|---|
| | 25° C. | 40° C. | 55° C. | 70° C. |
| Copolymer 1 | 850 | 680 | 630 | 580 |
| Comparison Dispersing Agent | 920 | 640 | 480 | 390 |

EXAMPLE 2

Three different 78 percent chalk aqueous slurries were produced, all of which had a pH value of 9 and differed only by the amount of the dispersing agent (DA) used. Copolymer 3 was used as the dispersing agent. The amounts of 100 percent copolymer used as well as the viscosities of the 78 percent aqueous chalk slurries are listed in Table II. In order to facilitate a comparison with the state of the art, three different slurries with different amounts of the comparison dispersing agent were also produced.

TABLE II

| Dispersing Agent (DA) | Viscosity (mPas) | | |
|---|---|---|---|
| | (0.35% by wt. DA) | (0.4% by wt. DA) | (0.5% by wt. DA) |
| Copolymer 3 | 1600 | 850 | 680 |
| Comparison Dispersing Agent | 3100 | 920 | 650 |

Table II shows that even a very small amount of copolymer 1 suffices to develop an effective dispersing of the pigment compared with the state of the art.

EXAMPLE 3

Various 78 percent aqueous chalk slurries were produced using acrylic acid copolymers with various acrylamidopropane sulfonic acid contents as dispersing agent. The results are listed in Table III and were compared with the results obtained with the comparison dispersing agent.

TABLE III

| Co-polymer Number | Percent by weight acrylic acid | Percent by weight AMPS* | Viscosity of the Aqueous Slurries Upon Addition of | |
|---|---|---|---|---|
| | | | 0.35 percent dispersing agent (solid) | 0.50 percent dispersing agent (solid) |
| 2 | 85 | 15 | 570 | 460 |
| 1 | 70 | 30 | 500 | 440 |
| 4 | 50 | 50 | 550 | 400 |
| Comparison Dispersing Agent | 100 | | 1900 | 380 |

*2-acrylamido-2-methylpropanesulfonic acid

The embodiments of the invention in which an exclusive privilege or property is claimed are defined as follows:

1. A stable, highly concentrated aqueous slurry of an inorganic pigment selected from the group consisting of chalk, clay from primary and secondary deposits, satin white, titanium dioxide, kaolin, and dolomite, said slurry having a viscosity largely unaffected by temperature change between 25° C. and 70° C.; wherein the slurry is stabilized by a dispersant which is a copolymer of:

(a) 40 to 90 percent by weight of an ethylenically unsaturated aliphatic carboxylic acid selected from the group consisting of acrylic and methacrylic acids, (b) 10 to 60 percent by weight of a compound having the formula:

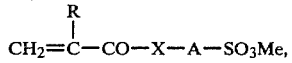

where
R is hydrogen or methyl
X is —NH— or —O—
A is $C_1$ to $C_8$ alkylene or $C_1$ to $C_3$ substituted alkylene, and Me is hydrogen, sodium potassium, or ammonium; and (c) 0 to 10 percent by weight of another ethylenically unsaturated copolymerizable monomer selected from the group consisting of acrylate and methacrylate esters of $C_1$–$C_4$ alcohols, $C_1$–$C_4$ esters or half esters of maleic acid, acrylo- and methacrylonitrile, acryl- and methacrylamide;

said copolymer dispersant having a K-value of 15 to 50 and an adjusted pH value of 7 to 8 in one percent solution at 20° C. and being used in an amount of 0.05 to 1.0 percent by weight based on the amount of pigment being dispersed.

2. The product of claim 1 wherein the copolymer is produced by the copolymerization of the monomer mixture in isopropanol containing 0 to 60 percent by weight of water at a temperature of 95° C. to 180° C. under autogenous pressure.

3. The product of claim 1 wherein the copolymer contains as a monomer of group (b), 2-acrylamido-2-methylpropanesulfonic acid in polymerized form.

4. The product of claim 2 wherein the copolymer contains as a monomer of group (b), 2-acrylamido-2-methylpropanesulfonic acid in polymerized form.

* * * * *